US009827845B2

(12) United States Patent
Miyaji et al.

(10) Patent No.: US 9,827,845 B2
(45) Date of Patent: Nov. 28, 2017

(54) VEHICLE INCLUDING SHUTTER DEVICE FOR ADJUSTING TEMPERATURE OF COOLANT WATER OF ENGINE

(71) Applicant: Toyota Jidosha Kabushiki Kaisha, Toyota-shi, Aichi-ken (JP)

(72) Inventors: Kazuya Miyaji, Okazaki (JP); Hitoki Sugimoto, Toyota (JP); Toshitake Sasaki, Toyota (JP); Yoshihisa Oda, Toyota (JP); Kenji Kimura, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/567,748

(22) Filed: Dec. 11, 2014

(65) Prior Publication Data

US 2015/0191078 A1    Jul. 9, 2015

(30) Foreign Application Priority Data

Jan. 7, 2014 (JP) ................................. 2014-001153

(51) Int. Cl.
    *B60K 11/08*     (2006.01)
    *G06F 19/00*     (2011.01)
    *F01P 7/12*      (2006.01)

(52) U.S. Cl.
    CPC .............. *B60K 11/085* (2013.01); *F01P 7/12* (2013.01)

(58) Field of Classification Search
    CPC ........................................................ F01P 7/12
    See application file for complete search history.

(56) References Cited

U.S. PATENT DOCUMENTS

| 6,200,021 B1* | 3/2001 | Mitsutani | ................. F01P 11/16 374/1 |
| 6,279,390 B1 | 8/2001 | Oka et al. | |
| 2002/0188415 A1 | 12/2002 | Fujimoto et al. | |
| 2003/0101947 A1 | 6/2003 | Ries-Mueller | |
| 2003/0110848 A1* | 6/2003 | Matsumoto | ............. F01P 11/16 73/114.71 |
| 2004/0226764 A1* | 11/2004 | Iwasaki | ..................... F01P 3/20 180/68.1 |
| 2010/0095909 A1* | 4/2010 | Lin | ......................... F01P 11/16 123/41.02 |

(Continued)

FOREIGN PATENT DOCUMENTS

JP    H10-176534 A    6/1998
JP    2002-364441 A   12/2002

(Continued)

*Primary Examiner* — Adam Tissot
(74) *Attorney, Agent, or Firm* — Dinsmore & Shohl LLP

(57) ABSTRACT

A grille shutter is a device configured to adjust a temperature of coolant water of an engine by adjusting an amount of outside air introduced into a radiator of the engine. An ECU performs a failure diagnosis for the engine based on a temperature of coolant water of the engine. When the grille shutter is immovable in an opened state of the grille shutter regardless of an operating command to the grille shutter, the ECU renders the failure diagnosis process for the thermostat valve not to be executed. As a result, an incorrect operation of various controls executed based on a temperature of coolant water of the engine can be suppressed.

12 Claims, 5 Drawing Sheets

(56) References Cited

U.S. PATENT DOCUMENTS

| | | | |
|---|---|---|---|
| 2010/0125401 A1* | 5/2010 | Hamama | F01P 7/167 701/103 |
| 2011/0118945 A1* | 5/2011 | Mochizukil | B60K 11/085 701/49 |
| 2012/0100790 A1* | 4/2012 | Miesterfeld | B60K 11/085 454/75 |
| 2013/0253758 A1 | 9/2013 | Nishi | |

FOREIGN PATENT DOCUMENTS

| | | |
|---|---|---|
| JP | 2003-531334 A | 10/2003 |
| JP | 2007022297 A | 2/2007 |
| JP | 2011-105219 A | 6/2011 |
| JP | 2012-127324 A | 7/2012 |

* cited by examiner

VEHICLE INCLUDING SHUTTER DEVICE FOR ADJUSTING TEMPERATURE OF COOLANT WATER OF ENGINE This nonprovisional application is based on Japanese Patent Application No. 2014-001153 filed on Jan. 7, 2014 with the Japan Patent Office, the entire contents of which are hereby incorporated by reference.

BACKGROUND OF THE INVENTION

1. Field of the Invention

The present invention relates to a vehicle including an engine and a shutter device configured to adjust a temperature of coolant water of an engine by adjusting an amount of outside air introduced into a radiator.

2. Description of the Background Art

Japanese Patent Laying-Open No. 2011-105219 discloses a vehicle including a shutter (grille shutter) capable of switching between an opened position of introducing outside air into a radiator and a closed position of prohibiting or suppressing introduction of the outside air. This vehicle further includes a motor configured to drive the shutter and a control device configured to control opening/closing operation of the shutter by applying a current to the motor. The control device performs an abnormality determination as to an operating state of the shutter based on a current value provided at the time of intermittently applying a current to the motor (refer to Japanese Patent Laying-Open No. 2011-105219).

Various controls are performed based on a temperature of coolant water of an engine. For example, a temperature of coolant water of an engine may be used for a failure diagnosis for a thermostat valve provided on a passage through which engine coolant water flows, an oil temperature estimation for the engine, or the like.

Opened and closed states of the shutter (grille shutter) disclosed in Japanese Patent Laying-Open No. 2011-105219 described above affects a temperature of coolant water of the engine. When this shutter is rendered to be immovable in the opened state due to a failure or jamming of a foreign object, a gap between a drop in a coolant water temperature during stopping of the engine and a rise in a coolant water temperature at the time of operation of the engine increases, causes a change in the coolant water temperature to increase. This tendency is particularly remarkable in a hybrid vehicle in which an intermittent operation (stopping/operating) of an engine is performed in accordance with an SOC (State Of Charge) of a power storage device, traveling power, or the like.

An excessive change in the engine coolant water temperature may cause an incorrect operation in various controls executed based on the coolant water temperature. Such a problem has not been particularly reviewed in the patent document described above.

SUMMARY OF THE INVENTION

Therefore, an object of the present invention is to suppress an incorrect operation of various controls executed based on a temperature of coolant water of an engine in a vehicle including a shutter device configured to adjust a temperature of coolant water of an engine by adjusting an amount of outside air introduced into a radiator.

According to the present invention, a vehicle includes an engine, a shutter device, and a control device. The shutter device is a device configured to adjust a temperature of coolant water of the engine by adjusting an amount of outside air introduced into a radiator of the engine. The control device executes a predetermined control based on a temperature of coolant water of the engine. When the shutter device is immovable in an opened state regardless of an operation command to the shutter device, the control device renders the predetermined control not to be not executed.

According to this vehicle, under the condition where the shutter device is rendered to be immovable in the opened state, so that an excessive change in the engine coolant water temperature may occur, a control based on the engine coolant water temperature is not executed. Therefore, an incorrect operation of the control described above can be suppressed.

Preferably, the vehicle further includes a cooling device configured to cool the engine. The cooling device includes a coolant water passage formed in the engine, the radiator configured to cool the coolant water, a radiator circulation passage, a bypass passage, a thermostat valve, an electric pump, and a temperature detector. The radiator circulation passage is a passage configured to allow coolant discharged from the coolant water passage to pass through the radiator and return to the coolant water passage. The bypass passage is a passage configured to allow coolant water discharged from the coolant water passage to return to the coolant water passage without passing through the radiator. The thermostat valve is connected to the radiator circulation passage and the bypass passage, and is switched in accordance with a temperature of coolant water flowing in the thermostat valve to either a closed state or an opened state. In the closed state, the thermostat valve interrupts coolant water from the radiator circulation passage and outputs coolant water from the bypass passage to the coolant water passage. In the opened state, the thermostat valve outputs coolant water from the radiator circulation passage and coolant water from the bypass passage to the coolant water passage. The temperature detector detects a temperature of the coolant water of the engine. The predetermined control described above includes a control of performing a failure diagnosis for the thermostat valve based on a temperature of the coolant water detected by the temperature detector.

More preferably, the temperature detector includes a first temperature sensor and a second temperature sensor. The first temperature sensor detects a temperature of coolant water in the coolant water passage. The second temperature sensor detects a temperature of coolant water in the radiator circulation passage. The predetermined control includes the control of performing the failure diagnosis for the thermostat valve based on a detected value of the first temperature sensor and a detected value of the second temperature sensor.

More preferably, the control device calculates an estimate value of a coolant water temperature in the radiator circulation passage based on a leakage flow rate flowing through the radiator circulation passage in the closed state of the thermostat valve and an output of the first temperature sensor, and diagnoses that the thermostat valve is failed when an output value of the second temperature sensor is greater than the calculated estimated value.

In this vehicle, while the failure diagnosis for the thermostat valve is performed based on a temperature of coolant water of the engine detected by the temperature detector, the failure diagnosis for the thermostat valve described above is not executed under the condition where the shutter device is rendered to be immovable in the opened state and an excessive change in the engine coolant water temperature may occur. Thus, according to this vehicle, an incorrect diagnosis in the failure diagnosis for the thermostat valve can be suppressed.

Preferably, the predetermined control includes a control of estimating an oil temperature of the engine with use of a temperature of coolant water of the engine.

According to this vehicle, under the condition where the shutter device is rendered to be immovable in the opened state, and an excessive change in the engine coolant water temperature may occur, estimation of an engine oil temperature with use of the engine coolant water temperature is not performed. Therefore, an incorrect estimation of an oil temperature of the engine can be suppressed.

Preferably, the control device detects a failure of the shutter device, and renders the predetermined control not to be executed when an open failure of the shutter device is detected.

Preferably, the shutter device is provided at a front grille of the vehicle, and adjusts an amount of air passing through the front grill by adjusting an opening degree of a shutter.

Preferably, the vehicle further includes a motor configured to generate a traveling drive force. The vehicle can travel while switching modes between a first traveling mode of stopping the engine and traveling with use of the motor and a second traveling mode of traveling by operating the engine.

This vehicle is a hybrid vehicle capable of traveling by switching modes between the first traveling mode (EV traveling mode) and the second traveling mode (HV traveling mode). When the shutter device is rendered to be immovable in the opened state, an excessive change in the engine coolant water temperature may occur remarkably. According to this vehicle, the control based on the engine coolant water temperature is not executed under such a condition. Therefore, an incorrect operation of the control can be suppressed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
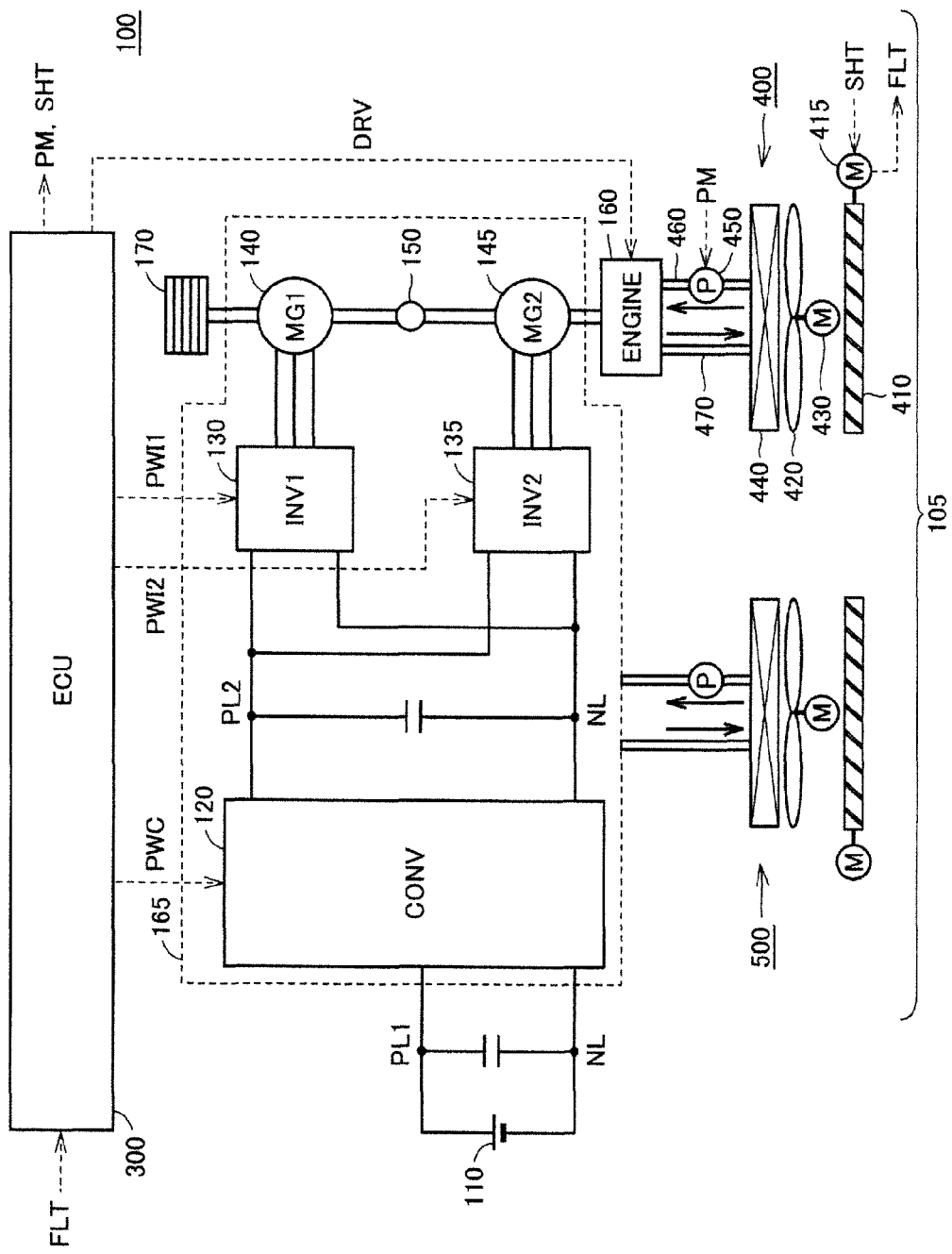
FIG. 1 is a block diagram representing an entire vehicle in accordance with the present embodiment.

In the following, embodiments of the present invention will be described in detail with reference to the drawings. In the following, a plurality of embodiments will be described. However, suitably combining the configurations described in the embodiments was originally assumed from the time of filing of the present application. It should be noted that the same or corresponding parts in the drawings have the same reference numerals allotted, and description thereof will not be repeated.

First Embodiment

Basic Configuration of Vehicle

FIG. 1 is a block diagram representing an entire vehicle 100 in accordance with the present embodiment. Referring to FIG. 1, vehicle 100 includes a driving device 105, a power storage device 110, and an ECU (Electronic Control Unit) 300 as a control device.

Driving device 105 includes an engine 160 as an internal combustion engine, an electrical driving unit 165, drive wheels 170, and cooling devices 400, 500. Electrical driving unit 165 includes a converter 120, inverters 130, 135, motor generators 140, 145 as rotary electric machines, and a motive power transmission gear 150.

In FIG. 1, a hybrid vehicle provided with engine 160 and motor generators 140, 145 will be described as an example. However, the present invention is also applicable to a vehicle traveling with use of only an engine as a drive source. Moreover, in the case of using a motor generator, the present invention is also applicable to either the case with one motor generator or the case with two or more motor generators.

Power storage device 110 is an power storing element configured to be chargeable and dischargeable. Power storage device 110 is configured to include, for example, a rechargeable battery such as a lithium-ion battery, a nickel hydride battery, or a lead storage battery, or a power storage element such as an electric double layer capacitor.

Power storage device 110 is connected to converter 120 through power lines PL1, NL. Power storage device 110 supplies power for generating a drive force of vehicle 100 to electrical driving unit 165. Moreover, power storage device 110 stores power generated at motor generators 140, 145. An output of power storage device 110 is, for example, about 200V.

Converter 120 boosts a voltage between a power line PL2 and power line NL to be higher than or equal to a voltage between power line PL1 and power line NL (corresponding to a voltage of power storage device 110). For example, converter 120 is configured with a voltage-boosting chopper circuit including upper and lower arms and a reactor connected between an intermediate point of the upper and lower arms and power line PL1.

Inverters 130, 135 are connected to power lines PL2, NL in parallel. Inverters 130, 135 are controlled based on control signals PWI1, PWI2 from ECU 300 respectively, and convert direct-current power supplied from converter 120 into alternate-current power to drive motor generators 140, 145 respectively.

Motor generators 140, 145 are alternate-current rotary electric machines, for example, permanent magnet type synchronous motors including a rotor having a permanent magnet buried therein. Output torque of motor generators 140, 145 is transmitted to drive wheels 170 through motive power transmission gear 150 configured to include a power split mechanism as represented by a reducer and a planetary gear, thereby allowing vehicle 100 to travel. Motor generators 140, 145 can generate power with a rotational force of drive wheels 170 during regenerative braking operation of vehicle 100. The generated power is converted by inverters 130, 135 and converter 120 into charging power for power storage device 110, thereby charging power storage device 110.

Moreover, motor generators 140, 145 are also coupled to engine 160 through motive power transmission gear 150. ECU 300 controls motor generators 140, 145 and engine 160 to operate cooperatively, thereby generating a required vehicle driving force. Further, motor generators 140, 145 can generate power with rotation of engine 160 or rotation of drive wheels 170, and the generated power can be used to charge power storage device 110. In the first embodiment, motor generator 145 is exclusively used as a motor for driving drive wheels 170, and motor generator 140 is exclusively used as a power generator driven by engine 160.

An output shaft of motor generator 140 is coupled to a sun gear of a planetary gear (not illustrated in the drawings) included in motive power transmission gear 150. An output shaft of motor generator 145 is coupled to a ring gear of the planetary gear through the reducer. Moreover, an output shaft of engine 160 is coupled to a planetary carrier of the planetary gear.

Cooling device 400 is a device configured to cool engine 160 with use of cooling medium such as coolant water. Cooling device 400 includes a grille shutter 410, a cooling fan 420, a radiator 440, and an electric water pump (hereinafter, referred to as "electric pump") 450. Radiator 440 is connected to engine 160 by cooling pipes 460, 470. Electric pump 450 is provided on cooling pipe 460 and sends out cooling medium cooled at radiator 440 to engine 160. The sent-out cooling medium circulates through a coolant passage provided in engine 160 to perform a heat exchange and thereby cool engine 160. ECU 300 controls a rotational speed of electric pump 450 with a control signal PM to adjust the amount of cooling medium sent out from electric pump 450. The cooling medium warmed up by the heat exchange returns to radiator 440 through cooling pipe 470 and is cooled again by outside air.

Grille shutter 410 is a device provided on an air introducing passage such as a front grille (not illustrated in the drawings) of vehicle 100 and configured to adjust a temperature of coolant water of engine 160 by adjusting an amount of outside air introduced into radiator 440 provided in an engine room. Grille shutter 410 has a plurality of movable fins driven by motor 415, and the movable fins can be opened and closed. Motor 415 is controlled by a control signal SHT from ECU 300 and adjusts an opening degree of the movable fins. Accordingly, the amount of air introduced into radiator 440 through grille shutter 410 can be adjusted.

Moreover, rendering grille shutter 410 to be in a fully closed state can reduce an air resistance of vehicle 100 and suppress generation of a lifting force caused by reduction of air introduced into the engine room. Further, a flow of air on the vehicle front side toward a lower side of a floor surface can generate a force of pulling the vehicle downward (down force). Accordingly, a traveling state of the vehicle can be stabilized particularly during high-speed traveling.

Moreover, motor 415 outputs a signal FLT indicating its rotating position to ECU 300. Accordingly, an opening degree of grille shutter 410 (opening degree of movable fins) can be detected. A positional sensor or the like capable of directly detecting an opening degree of grille shutter 410 (opening degree of the movable fins) may be provided separately.

The air having passed through grille shutter 410 is supplied to radiator 440 by cooling fan 420. Cooling fan 420 is an electric fan driven by motor 430, and its rotational speed is adjusted by a control signal from ECU 300. By adjusting the rotational speed of cooling fan 420 in such a manner, the amount of wind supplied to radiator 440 is changed, so that the cooling efficiency of the cooling medium in radiator 440 is adjusted.

In the present invention, having the functions of adjusting the amount of wind of cooling fan 420 and adjusting a flow rate of electric pump 450 is not necessarily essential, and it may be all necessary to supply a constant wind amount and flow rate by rotation at a constant speed.

Cooling device 500 is a device configured to cool electrical driving unit 165, and its basic configuration is the same as that of cooling device 400. Therefore, detailed description of cooling device 500 will not be repeated.

In FIG. 1, the exemplary case is described where cooling device 400 configured to cool engine 160 and cooling device 500 configured to cool electrical driving unit 165 are provided individually. However, it is also possible to have a configuration of cooling engine 160 and electrical driving unit 165 with use of a single cooling device. Alternatively, for example, although systems for circulating cooling medium are provided independently, it is also possible to have a configuration in which the cooling fan and/or the grille shutter are used in common. In the case where cooling devices 400, 500 are provided individually, it is possible to control each of cooling devices 400, 500 independently.

ECU 300 includes a CPU (Central Processing Unit), a storage device, and an input-output buffer, none of which is illustrated in FIG. 1, and performs inputting of a signal from each sensor and outputting of a control signal to each equipment, and controls vehicle 100 and each equipment. As a main control related to this invention, ECU 300 executes a failure diagnosis for engine 160. In the first embodiment, ECU 300 executes a failure diagnosis for a thermostat valve provided in engine 160. This failure diagnosis will be described later in detail. The control executed by ECU 300 is not limited to the process executed by means of software but also the process by a dedicated hardware (electronic circuit).

In FIG. 1, it is configured so that a single control device is provided as ECU 300. However, it may also be configured so that an individual control device for each function or each controlled equipment, such as a control device for driving device 105 or a control device for power storage device 110, is provided.

Configuration of Cooling Device of Engine 160

Figure 2:
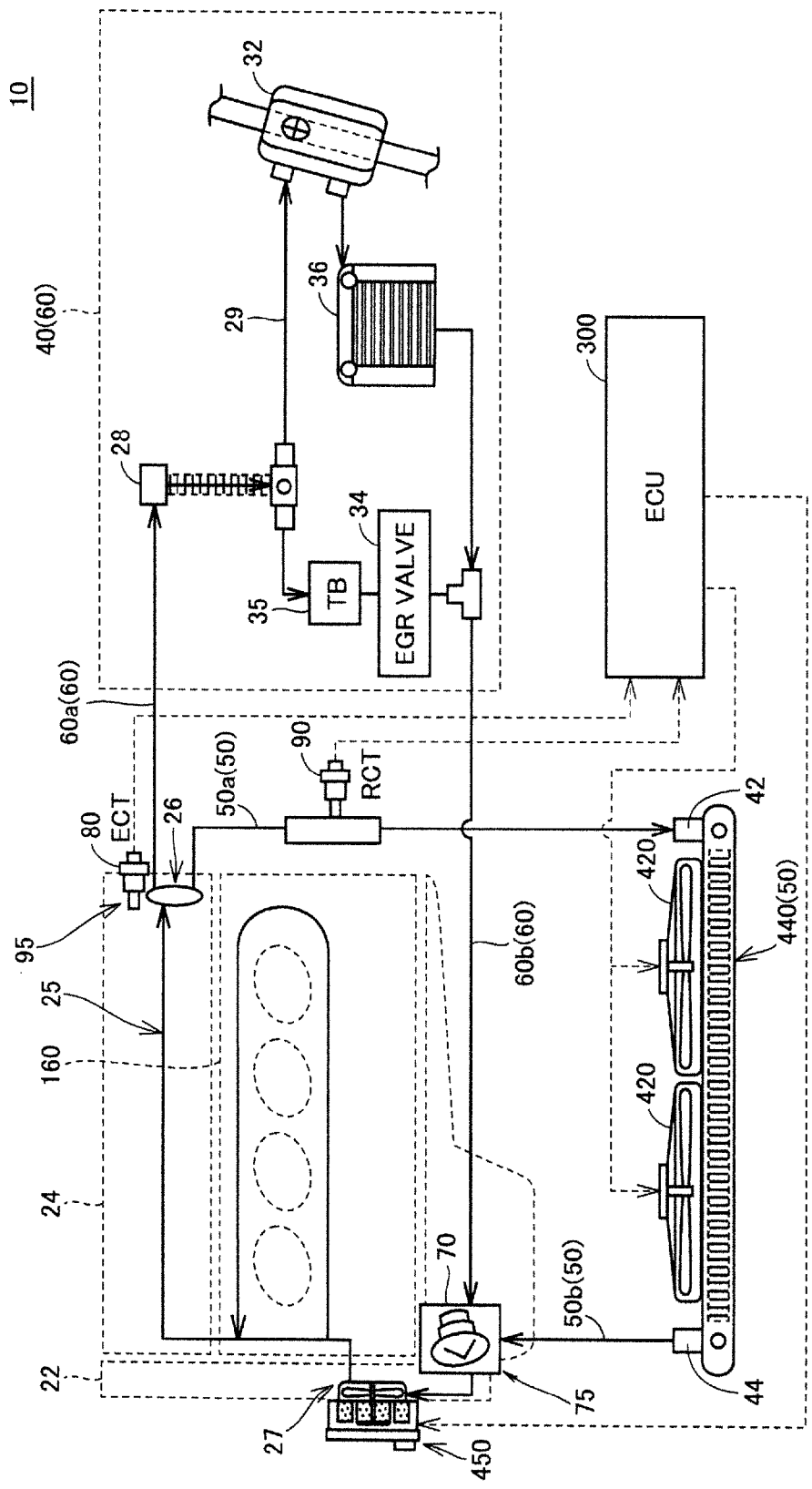
FIG. 2 represents a schematic configuration of a cooling device of the engine shown in FIG. 1.

FIG. 2 represents a schematic configuration of the cooling device of engine 160 shown in FIG. 1. Referring to FIG. 2, an engine cooling device 10 for cooling engine 160 includes radiator 440, electric pump 450, a radiator circulation passage 50, a bypass passage 60, and a thermostat valve 70. Moreover, engine cooling device 10 further includes an engine-side coolant water temperature sensor 80 and a radiator-side coolant water temperature sensor 90.

Engine 160 has a water jacket 24 configured to cool engine 160 by means of coolant water. Water jacket 24 is formed around cylinders of engine 160 and constitutes a coolant water passage 25 allowing coolant water to pass therethrough. Coolant water passage 25 is provided between an inlet 27 and an outlet 26, and allows coolant water from inlet 27 to be sent out from outlet 26. The coolant water flowing into coolant water passage 25 performs a heat exchange with engine 160 to cool engine 160. Accordingly, engine 160 is maintained at a temperature which is suitable for combustion.

Electric pump 450 is mounted to an attachment-side surface portion 22 of an engine body. Electric pump 450 allows coolant water to be sent out from inlet 27 into coolant water passage 25. Driving and stopping of electric pump 450 is controlled by a control signal received from ECU 300. Further, a discharge amount of coolant water discharged from electric pump 450 is controlled by a control signal received from ECU 300.

Outlet 26 constitutes a branch portion 95. Branch portion 95 is connected to radiator circulation passage 50 and bypass passage 60. Branch portion 95 divides coolant water from coolant water passage 25 into coolant water directed to radiator circulation passage 50 and coolant water directed to bypass passage 60.

Radiator circulation passage 50 is a passage for circulating coolant water between engine 160, electric pump 450, and radiator 440. Radiator circulation passage 50 includes pipes 50a, 50b and radiator 440. Pipe 50a is provided between branch portion 95 and an inlet 42 of radiator 440. Pipe 50b is provided between an outlet 44 of radiator 440 and thermostat valve 70. Coolant water warmed up in engine 160 passes through radiator 440 and is cooled.

Bypass passage 60 is a passage for circulating coolant water without passing through radiator 440. Bypass passage 60 includes pipes 60a, 60b and thermal equipment 40 which will be described later. Pipe 60a is provided between branch portion 95 and thermal equipment 40. Pipe 60b is provided between thermal equipment 40 and thermostat valve 70.

Thermal equipment 40 includes an EGR (Exhaust Gas Recirculation) cooler 28, a pipe 29, an exhaust heat recovery unit 32, a heater 36, a throttle body 35, and an EGR valve 34.

EGR cooler 28 cools EGR gas by means of coolant water. Throttle body 35 is warmed up by coolant water to prevent occurrence of adhesion and the like. EGR valve 34 is cooled by the coolant water. Exhaust heat recovery unit 32 warms up coolant water by means of heat of exhaust gas to improve engine starting performance during the low temperature. Heater 36 is used as a heater of an air-conditioning device, and performs a heat exchange between coolant water and blowing air of the air-conditioning device to heat the blowing air.

Thermostat valve 70 is arranged at a merging portion 75 which merges coolant water having passed through radiator circulation passage 50 and coolant water having passed through bypass passage 60. Merging portion 75 is connected to radiator 440 through pipe 50b and connected also to pipe 60b. The coolant water from merging portion 75 returns to a suction port of electric pump 450. Thermostat valve 70 is configured to be switched to either a closed state or an opened state in accordance with a temperature of coolant water flowing in thermostat valve 70 (near the valve body).

When the temperature of coolant water near the valve body of thermostat valve 70 is less than a predetermined valve-opening temperature (for example, less than 70° C.), thermostat valve 70 is rendered to be in the closed state. In this case, coolant water on the side of bypass passage 60 passes through thermostat valve 70 and is outputted to water jacket 24. However, coolant water on the side of radiator circulation passage 50 is interrupted by thermostat valve 70 and not outputted to water jacket 24. Accordingly, coolant water which has taken heat of engine 160 circulates to engine 160 (water jacket 24) without being cooled at radiator 440, so that engine 160 is warmed up.

On the other hand, when the temperature of coolant water near the valve body of thermostat valve 70 is higher than or equal to the predetermined valve-opening temperature, thermostat valve 70 is rendered to be in the opened state. In this case, coolant water from radiator circulation passage 50 and coolant water from bypass passage 60 pass through thermostat valve 70 and are outputted to water jacket 24. The opening degree of thermostat valve 70 is adjusted in accordance with the temperature of the coolant water. Accordingly, a mixture ratio of the coolant water from radiator circulation passage 50 and coolant water from bypass passage 60 is adjusted, so that the temperature of coolant water flowing through water jacket 24 is maintained at a temperature suitable for engine 160.

Engine-side coolant water temperature sensor 80 is provided at branch portion 95. Engine-side coolant water temperature sensor 80 detects a temperature of coolant water sent out from outlet 26 (hereinafter, referred to as "engine outlet water temperature ECT" or simply as "ECT"), and outputs a detection result (ECT detected value) to ECU 300. It should be noted that engine-side coolant water temperature sensor 80 is all necessary to be provided on a passage through which coolant water always circulates, and it may be provided for example on coolant water passage 25.

Radiator-side coolant water temperature sensor 90 is provided on pipe 50a. Radiator-side coolant water temperature sensor 90 detects a temperature of coolant water flowing into pipe 50a of radiator circulation passage 50 (hereinafter, referred to as "radiator inlet water temperature RCT" or simply as "RCT") and outputs a detection result (RCT detected value) to ECU 300. It should be noted that radiator-side coolant water temperature sensor 90 is all necessary to be provided on radiator circulation passage 50, and it may be provided for example on pipe 50b.

In engine cooling device 10 having such a configuration as described above, when thermostat valve 70 is failed, abnormalities such as a close failure, in which the valve body does not open even when the coolant water temperature near the valve body rises to be higher than or equal to the valve-opening temperature, or an open failure, in which the valve body does not close even when the coolant water temperature near the valve body drops to be lower than the valve-opening temperature, may occur. In a state where such a failure occurs, coolant water of a suitable water temperature cannot be supplied to coolant water passage 25 of engine 160, so that an operation efficiency of engine 160 is lowered. Therefore, it is preferable to continuously perform a failure diagnosis on whether or not thermostat valve 70 functions in a normal manner during operation of engine 160 to find out the failure in an early stage.

Therefore, ECU 300 performs a failure diagnosis for thermostat valve 70 based on an ECT detected value received from engine-side coolant water temperature sensor 80 and an RCT detected value received from radiator-side coolant water temperature sensor 90.

As one example, ECU 300 performs a failure diagnosis with a high diagnostic accuracy as described below. In other words, in a water temperature region where thermostat valve 70 essentially does not open (a water temperature region lower than the valve-opening temperature), since thermostat valve 70 is in the closed state, coolant water flows into bypass passage 60, and coolant water does not flow into radiator circulation passage 50, in a theoretical context. Therefore, it causes a difference greater than or equal to a predetermined value between the ECT detected value and RCT detected value. Thus, in the water temperature region where thermostat valve 70 essentially does not open, when the difference between the ECT detected value and RCT detected value is less than the predetermined value, it can be determined that thermostat valve 70 is opened, in other words, the open failure occurs in thermostat valve 70.

However, indeed, even when thermostat valve 70 is closed in a normal manner, if the water pressure in radiator circulation passage 50 rises due to driving of electric pump 450, coolant water in radiator circulation passage 50 leaks out from thermostat valve 70 to coolant water passage 25. In this case, even though thermostat valve 70 is in the closed state, coolant water of the amount corresponding to a leakage flow rate of thermostat valve 70 flows from coolant water passage 25 into radiator circulation passage 50, and is mixed with coolant water present in radiator circulation passage 50, so that radiator inlet water temperature RCT comes close to engine outlet water temperature ECT. Accordingly, since a temperature difference between the ECT detected value and RCT detected value becomes smaller, the accuracy of the failure diagnosis may be lowered.

Therefore, ECU 300 performs the failure diagnosis for thermostat valve 70 while taking into account that coolant water leaks out from thermostat valve 70 even when thermostat valve 70 is in a normal state. Specifically, ECU 300 calculates an estimated value of radiator inlet water temperature RCT based on the ECT detected value and the leakage flow rate of thermostat valve 70, and performs the process of diagnosing whether or not thermostat valve 70 is failed (hereinafter, referred to as "thermostat valve failure diagnosis process") based on a comparison result between the calculated RCT estimated value and the RCT detected value. The thermostat valve failure diagnosis process will be described later in detail with reference to a flowchart.

Such a failure diagnosis for thermostat valve 70 based on water temperature detected values of engine-side coolant water temperature sensor 80 and radiator-side coolant water temperature sensor 90 is affected by opened and closed states of grille shutter 410 (FIG. 1). Specifically, when grille shutter 410 is rendered to be immovable in the opened state regardless of the operation command to grille shutter 410, a gap between a drop of the coolant water temperature during stopping of the engine and a rise in the coolant water temperature during operation of the engine becomes greater, so that a change in the coolant water temperature becomes greater. Such an excessive change in the engine coolant water temperature may cause an incorrect diagnosis for thermostat valve 70 based on the detected value of the coolant water temperature. Moreover, when grille shutter 410 is rendered to be immovable in the opened state, it also becomes difficult to expect the cooling performance by means of air passing through grille shutter 410 (in other words, when grille shutter 410 is immovable in the closed state, the cooling performance can be estimated since the amount of air passing through grille shutter 410 is 0).

Therefore, in the first embodiment, when grille shutter 410 is rendered to be immovable in the opened state, the failure diagnosis for thermostat valve 70 is not performed. Grille shutter 410 is rendered to be immovable in the opened state not only by a failure of grille shutter 410 (open failure) but also by jamming of a foreign object at movable fins of grille shutter 410 (for example, snow is deposited and frozen).

Failure Diagnosis Process for Thermostat Valve 70

Figure 3:
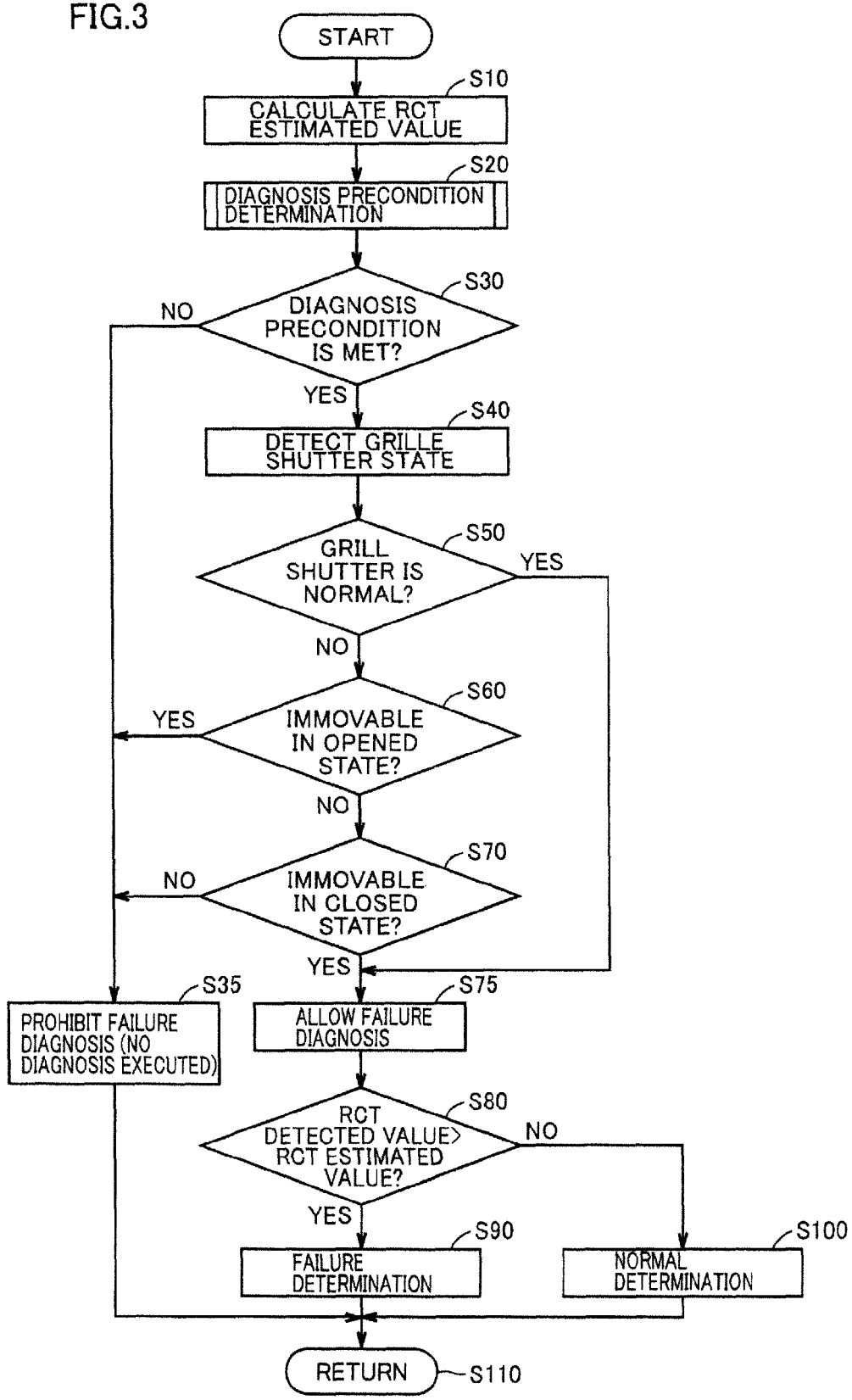
FIG. 3 is a flowchart for explanation of procedures of a thermostat valve failure diagnosis process executed by an ECU.

FIG. 3 represents a flowchart for explanation of the procedures for the thermostat valve failure diagnosis process executed by ECU 300. The process shown in this flowchart is executed at the time of starting of engine 160, for example, at the time of starting of the engine after idling stop. In the case where vehicle 100 is a hybrid vehicle, the process is further executed at the time of starting engine when the EV traveling of stopping engine 160 and traveling with use of a drive force of the motor is switched to the HV traveling of operating engine 160 for traveling. This flowchart is achieved by executing a program stored in advance in ECU 300 at predetermined cycles. For some steps, the process can be achieved by preparing a dedicated hardware (electronic circuit).

Referring to FIG. 3, ECU 300 calculates an estimated value of radiator inlet water temperature RCT (RCT estimated value) based on an ECT detected value received from engine-side coolant water temperature sensor 80 and a leakage flow rate flowing into radiator circulation passage 50 in the closed state of thermostat valve 70 (Step S10). Specifically, ECU 300 can calculate the RCT estimated value using the following equation as one example.

$$\text{RCT estimated value} = (\text{ECT detected value} \times \text{leakage flow rate} + \text{RCT estimated value (previous value)} \times (\text{pipe volume} - \text{leakage flow rate}))/\text{pipe volume} \quad (1)$$

In Equation (1), the RCT estimated value is calculated assuming that the coolant water with the ECT detected value and the coolant water with the RCT estimated value (previous value) are evenly mixed in accordance with a ratio of the leakage flow rate with respect to the pipe volume.

It should be noted that the leakage flow rate may be a fixed value determined in advance by an experimental result or the like, or it may be a variable value set to be a larger value as the flow rate of electric pump 450 is greater. The pipe volume is a volume of the pipe through which coolant water flows from engine-side coolant water temperature sensor 80 to radiator-side coolant water temperature sensor 90. Moreover, the calculation accuracy can be improved by dividing the pipe passage into any suitable number of regions and applying Equation (1) to each of the divided regions.

Next, ECU 300 performs the process of determining whether or not the precondition (hereinafter, simply referred to as "diagnosis precondition") for performing the open failure diagnosis process for thermostat valve 70 is met (Step S20). The contents of the process will be described later in FIG. 4.

Then, ECU 300 determines whether or not the open failure diagnosis process is to be performed based on the process result in Step S20 (Step S30). When it is determined that the diagnosis precondition is not met (NO in Step S30), ECU 300 prohibits the thermostat open failure diagnosis (Step S35). In other words, the thermostat open failure process is rendered not to be executed. Thereafter, ECU 300 allows the process to proceed to Step S110.

In Step S30, when it is determined that the diagnosis precondition is met (YES in Step S30), ECU 300 detects a state of grille shutter 410 (FIG. 1) (Step S40). Specifically, ECU 300 detects if grille shutter 410 is in a normal state or an abnormal state based on an opening degree command (control signal SHT) and opening degree detected value (signal FLT) of grille shutter 410. In the case of the abnormal state, ECU 300 detects if grille shutter 410 is rendered to be immovable in the opened state, rendered to be immovable in the closed state, or being in an unsettled state.

When it is determined that grille shutter 410 is in a normal state (YES in Step S50), ECU 300 shifts the process to Step S75, and allows execution of the open failure diagnosis for thermostat valve 70 (described later).

When it is determined that grille shutter 410 is not in a normal state (NO in Step S50), ECU 300 determines whether or not grille shutter 410 is immovable in the opened state (Step S60). When it is determined that grille shutter 410 is immovable in the opened state (YES in Step S60), ECU 300 shifts the process to Step S35. In other words, when grille shutter 410 is immovable in the opened state, the open failure diagnosis process for thermostat valve 70 is not executed.

In Step S60, when it is determined that grille shutter 410 is not "immovable in the opened state" (NO in Step S60), ECU 300 determines whether or not grille shutter 410 is immovable in the closed state (Step S70). When it is determined that grille shutter 410 is not "immovable in the closed state" (NO in Step S70), grille shutter 410 is determined as being in the unsettled state, and ECU 300 allows the process to shift to Step S35. In other words, the open failure diagnosis process for thermostat valve 70 is not executed also in this case.

In Step S70, when it is determined that grille shutter 410 is immovable in the closed state (YES in Step S70), ECU 300 allows execution of the open failure diagnosis process for thermostat valve 70 (Step S75). Then, ECU 300 executes the open failure diagnosis process for thermostat valve 70 indicated by the subsequent Steps S80 to S100.

In other words, ECU 300 determines whether or not the RCT detected value received from radiator-side coolant water temperature sensor 90 is higher than the RCT estimated value calculated in Step S10 (Step S80). When the RCT detected value is higher than the RCT estimated value (YES in Step S80), ECU 300 determines that thermostat valve 70 is in the open failure state (Step S90). This is because, when thermostat valve 70 is in the open failure state, heated coolant water of an amount greater than expected leakage flow rate flows into radiator circulation passage 50, and the situation with an RCT detected value higher than an RCT estimated value occurs. On the other hand, when the RCT detected value is less than or equal to the RCT estimated value (NO in Step S80), ECU 300 determines that thermostat valve 70 is in the normal state (Step S100).

Figure 4:
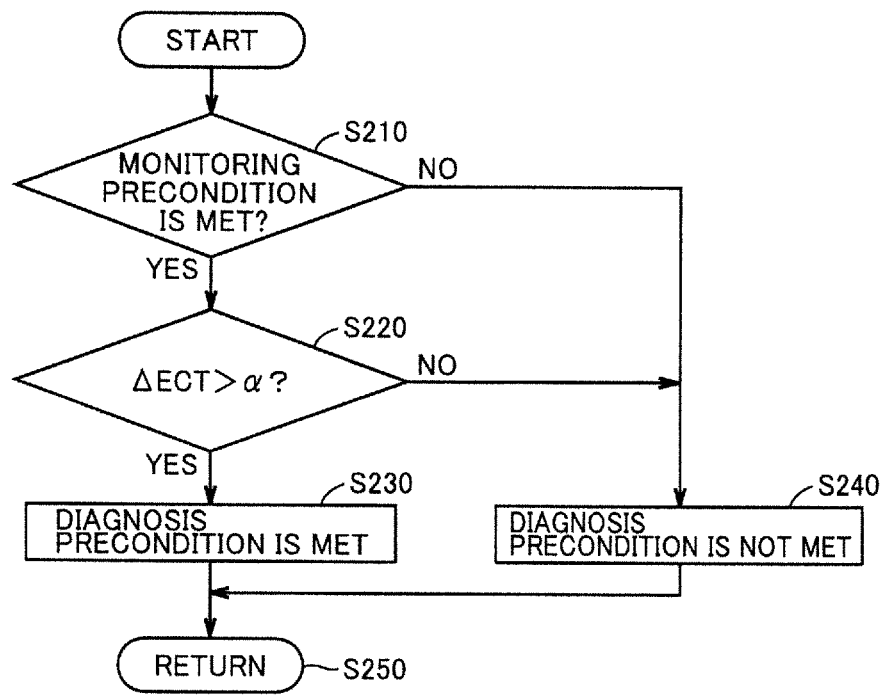
FIG. 4 is a flowchart representing procedures of the diagnosis precondition determination executed in Step S20 of FIG. 3.

FIG. 4 is a flowchart representing the process procedures for the diagnosis precondition determination executed in Step S20 of FIG. 3. Referring to FIG. 4, ECU 300 determines whether or not the monitoring precondition is met (Step S210). The monitoring precondition is a condition set as a precondition for monitoring a water temperature rise quantity ΔECT indicating a rise in the coolant water temperature from starting of the engine. As one example, ECU 300 determines that the monitoring condition is met when all of the following conditions (a) to (f) are met.

(a) After current starting of an engine, the thermostat failure diagnosis is not completed.
(b) The ECT detected value is less than the valve-opening temperature (for example, 70° C.) of thermostat valve 70.
(c) The ECT detected value at the time of starting the engine is included in the range of −10° C. to +56° C.
(d) The engine is started.
(e) The time change quantity of the ECT detected value is greater than or equal to a predetermined value (for example, 0.1° C./second).
(f) Engine-side coolant water temperature sensor 80 and radiator-side coolant water temperature sensor 90 are normal.

Condition (a) provides the premise that the thermostat failure diagnosis is performed once between starting of engine 160 and stopping next. Condition (b) is a condition for assuring that thermostat valve 70 is essentially (if it is normal) closed. Conditions (c) and (d) are conditions for assuring that the ECT detected value increases in a manner capable of performing the thermostat failure diagnosis after starting the engine. Condition (e) is a condition for assuring a rise in the engine water temperature after starting the engine. Condition (f) is a condition for assuring a reliability of the ECT detected value or the RCT detected value. It should be noted that, as the monitoring precondition, conditions (a) to (f) described above may be selected as needed.

When it is determined in Step S210 that the monitoring precondition is not met (NO in Step S210), ECU 300 shifts the process to Step S240 and determines that the diagnosis precondition is not met (Step S240).

When it is determined in Step S210 that the monitoring precondition is met (YES in Step S210), ECU 300 determines whether or not a water temperature rise quantity ΔECT indicating the rise quantity of the ECT detected value from starting of engine 160 is greater than a predetermined value a (Step S220). This predetermined value a is a determination value for the diagnosis precondition. As one example, predetermined value a is set to be about 1 to 2° C.

When it is determined in Step S220 that water temperature rise quantity ΔECT is greater than predetermined value a (YES in Step S220), ECU 300 determines that the diagnosis precondition is met (Step S230). When it is determined in Step S220 that water temperature rise quantity ΔECT is less than or equal to predetermined value a (NO in Step S220), ECU 300 determines that the diagnosis precondition is not met (Step S240).

As described above, in this first embodiment, while the high-accuracy failure diagnosis for thermostat valve 70 is performed based on outputs of engine-side coolant water temperature sensor 80 and radiator-side coolant water temperature sensor 90, the failure diagnosis for thermostat valve 70 described above is not executed under the condition where grille shutter 410 is rendered to be immovable in the opened state to cause an excessive change in the engine coolant water temperature. Thus, according to this first embodiment, an incorrect diagnosis of the failure diagnosis for thermostat valve 70 can be suppressed.

In the first embodiment described above, the failure diagnosis for thermostat valve 70 is performed while taking into account the leakage flow rate flowing through radiator circulation passage 50 in the closed state. However, the method for the failure diagnosis is not limited to such a method. For example, this invention is also applicable to the case where the failure diagnosis is performed based on more simple comparison between the ECT detected value and RCT detected value, the case where the failure diagnosis is performed with use of the ECT detected value only (one sensor), and the like.

Second Embodiment

In this second example, an oil temperature of engine 160 is estimated based on the coolant water temperature of engine 160. Specifically, the oil temperature of engine 160 is based on the coolant water temperature at the time of starting of engine 160, and is corrected by the quantity of drop in temperature by the engine driving state or driving wind, the quantity of drop in temperature due to the atmospheric temperature, and the like. Thus, the oil temperature estimation for this engine 160 is also affected by the opened and closed states of grille shutter 410 (FIG. 1). Therefore, also in this second embodiment, similarly to the first embodiment, the oil temperature estimation for engine 160 is not performed when grille shutter 410 is rendered to be immovable in the opened state.

The overall configuration of the vehicle according to this second embodiment is the same as that of vehicle 100 of the first embodiment shown in FIG. 1. In the second embodiment, as a main control of ECU 300, ECU 300 executes the control of estimating the oil temperature of engine 160.

Figure 5:
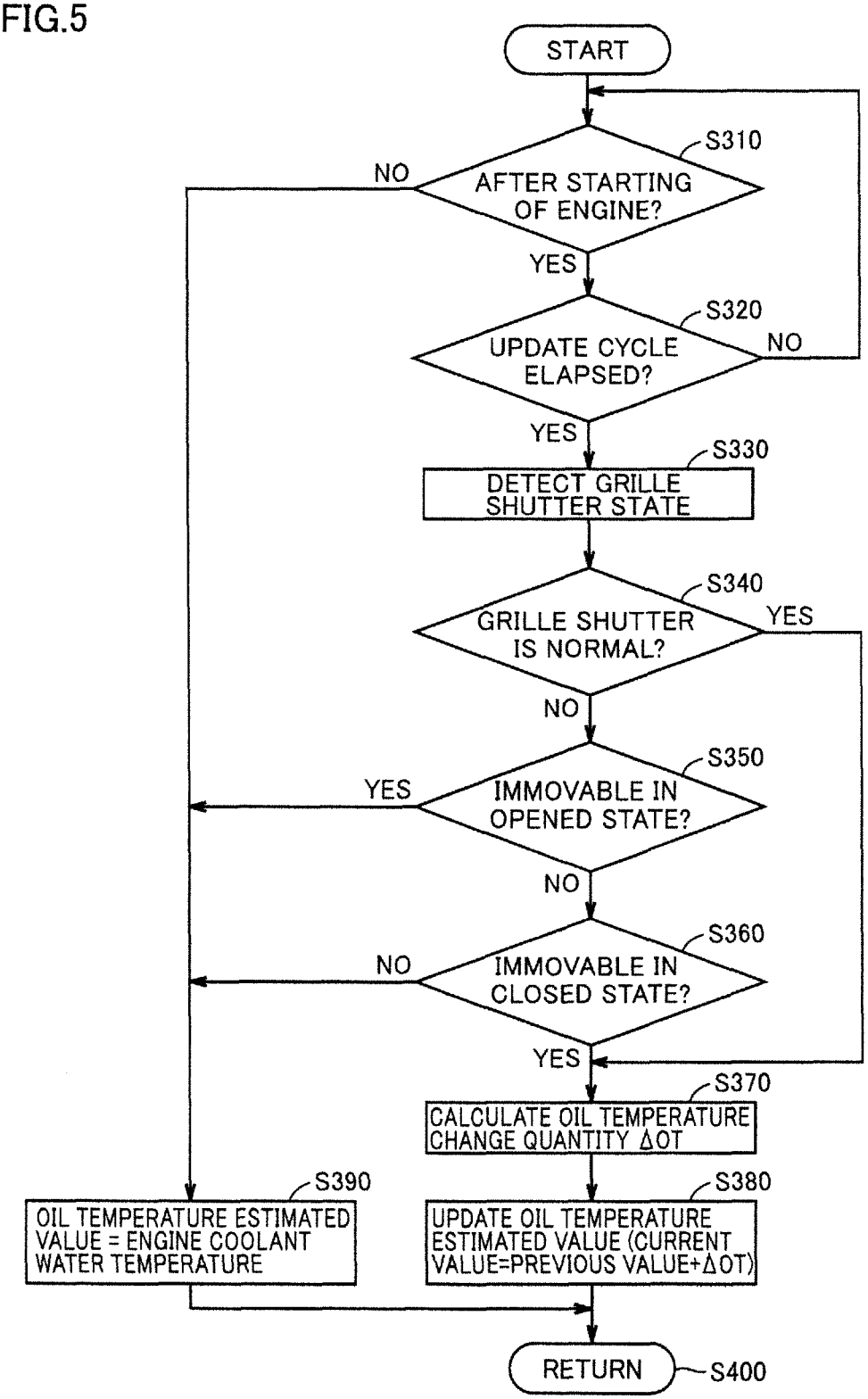
FIG. 5 is a flowchart for explanation of procedures of an oil temperature estimation for the engine executed by the ECU.

FIG. 5 is a flowchart for explanation of the process procedures of the oil temperature estimation for engine 160 executed by ECU 300. Referring to FIG. 5, ECU 300 determines whether or not engine 160 is started (Step S310). If it is before the starting of engine 160 (NO in Step S310), ECU 300 sets the coolant water temperature of engine 160 as an estimated value of the engine oil temperature (Step S390). The coolant water temperature of engine 160 is detected by a temperature sensor provided on the engine coolant water passage (for example, engine-side coolant water temperature sensor 80 (FIG. 2) or the like).

When it is determined in Step S310 that engine 160 is started (YES in Step S310), ECU 300 determines whether or not a predetermined update cycle for estimating and updating the engine oil temperature has elapsed (Step S320). When the updating cycle has elapsed (YES in Step S320), a state of grille shutter 410 is detected in Step S330. The processes executed in Step S330 to S360 are the same as the processes executed in Steps S40 to S70 in FIG. 3, respectively. Therefore, detailed description thereof will not be repeated.

When it is determined in Step S340 that grille shutter 410 is in a normal state (YES in Step S340), ECU 300 shifts the process to Step S370 and executes calculation for performing the oil temperature estimation for engine 160 (described later).

When it is determined in Step S350 that grille shutter 410 is immovable in the opened state (YES in Step S350), the process is shifted to Step S390. In other words, when grille shutter 410 is immovable in the opened state, the oil temperature estimation processes in Steps S370, S380 are not executed. Also when it is determined in Step S360 that grille shutter 410 is not "immovable in the closed state" (NO in Step S360), the process is shifted to Step S390, and the oil temperature estimation processes for engine 160 in Steps S370, S380 are not executed.

When it is determined in Step S360 that grille shutter 410 is immovable in the closed state (YES in Step S360), or when it is determined in Step S340 that grille shutter 410 is in a normal state as described above (YES in Step S340), ECU 300 calculates an oil temperature change quantity ΔOT of engine 160 (Step S370). This oil temperature change quantity ΔOT is a quantity of change in the engine oil temperature taking into account a regular temperature during an engine operation state, a lowered quantity of temperature due to traveling wind, and a lowered quantity of temperature due to an atmospheric temperature. This oil temperature change quantity ΔOT includes the lowered quantity of temperature due to traveling wind, and is affected by the opened and closed state of grille shutter 410.

Next, ECU 300 adds oil temperature change quantity ΔOT calculated in Step S370 to the oil temperature estimated value calculated in the previous calculation cycle to thereby calculate a present value of the oil temperature estimated value (Step S380). As described above, after starting of the engine, the oil temperature of engine 160 is estimated by correcting the engine coolant water temperature at the time of starting of the engine with oil temperature change amount ΔOT.

Though not particularly illustrated in the drawings, this estimated engine oil temperature is used for various controls. For example, the engine oil temperature is used for a feedback control of the VVT (Variable Valve Timing), a target phase angle control of the VVT, an ISC (Idle Speed Control) control, and the like.

As described above, in this second embodiment, under the condition where grille shutter 410 is rendered to be immovable in the opened state to cause an excessive change in the engine coolant water temperature, the estimation of the engine oil temperature with use of the engine coolant water temperature is not executed. Thus, according to this second embodiment, an incorrect estimation of the oil temperature of engine 160 can be suppressed.

In the description above, grille shutter 410 corresponds to one example of the "shutter device" of the present invention, and ECU 300 corresponds to one example of the "control device" of the present invention. Moreover, engine-side coolant water temperature sensor 80 corresponds to one example of the "first temperature sensor" of the present invention, and radiator-side coolant water temperature sensor 90 corresponds to one example of the "second temperature sensor" of the present invention.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A vehicle comprising:
   an engine;
   a shutter device configured to adjust a temperature of coolant water of said engine by adjusting an amount of outside air introduced into a radiator of said engine by adjusting an opening degree of a shutter; and
   a cooling device configured to cool said engine, said cooling device includes:
   a coolant water passage formed in said engine;
   a radiator configured to cool said coolant water;
   a radiator circulation passage configured to allow coolant water discharged from said coolant water passage to pass through said radiator and return to said coolant water passage;
   a bypass passage configured to allow coolant water discharged from said coolant water passage to return to said coolant water passage without passing through said radiator;
   a first temperature sensor configured to detect a temperature of coolant water in said coolant water passage;
   a second temperature sensor configured to detect a temperature of coolant water in said radiator circulation passage; and
   a thermostat valve connected to said radiator circulation passage and said bypass passage, and said thermostat valve is switched in accordance with a temperature of coolant water flowing in said thermostat valve to either a closed state or an opened state, in said closed state said thermostat valve interrupting coolant water from said radiator circulation passage and outputting coolant water from said bypass passage to said coolant water passage, in said opened state said thermostat valve outputting coolant water from said radiator circulation passage and coolant water from said bypass passage to said coolant water passage, and an electronic control unit configured to output an operation command to adjust said opening degree of said shutter, said electronic control unit configured to execute a predetermined control, said predetermined control includes a control of performing a failure diagnosis for said thermostat based on a detected value of said first temperature sensor and a detected value of said second temperature sensor, said electronic control unit is configured to calculate an estimated value of a coolant water temperature in said radiator circulation passage based on a leakage flow rate flowing through said radiator circulation passage in the closed state of said thermostat valve and an output of said first temperature sensor, and diagnoses that said thermostat valve is failed when an output value of said second temperature sensor is greater than said calculated estimated value, and said electronic control unit configured not to execute said predetermined control when said shutter device is immovable in an opened state in response to said operation command to said shutter device.

2. The vehicle according to claim 1, wherein said electronic control unit is configured to detect a failure of said shutter device, and renders said predetermined control not to be executed when an open failure of said shutter device is detected.

3. The vehicle according to claim 1, wherein said shutter device is provided at a front grille of said vehicle, and adjusts an amount of air passing through said front grille by adjusting said opening degree of said shutter.

4. The vehicle according to claim 1, further comprising a motor configured to generate a traveling drive force, wherein
said vehicle can travel while switching modes between a first traveling mode of stopping said engine and traveling with use of said motor and a second traveling mode of traveling by operating said engine.

5. The vehicle according to claim 3, wherein said electronic control unit is configured to determine said shutter device is immovable in said opened state based upon said opening degree of said shutter and said operation command to said shutter device.

6. The vehicle according to claim 5, wherein said shutter device includes a motor configured to adjust said opening degree of said shutter, said motor being operatively connected to said electronic control unit,
wherein said electronic control unit configured to output said operation command to said motor to adjust said opening degree of said shutter, and
wherein said motor outputs, to said electronic control unit, a position signal indicating a rotating position of said motor as said opening degree of said shutter.

7. A vehicle comprising:
an engine;
a shutter device configured to adjust a temperature of coolant water of said engine by adjusting an amount of outside air introduced into a radiator of said engine; and
an electronic control unit configured to execute a control of estimating an oil temperature of said engine with use of a temperature of coolant water of said engine,
said electronic control unit configured to render said control of estimating said oil temperature of said engine not to be executed when said shutter device is immovable in an opened state regardless of an operation command to said shutter device.

8. The vehicle according to claim 7, wherein said electronic control unit is configured to detect a failure of said shutter device, and renders said control of estimating said oil temperature of said engine not to be executed when an open failure of said shutter device is detected.

9. The vehicle according to claim 7, wherein said shutter device is provided at a front grille of said vehicle, and adjusts an amount of air passing through said front grille by adjusting an opening degree of a shutter.

10. The vehicle according to claim 7, further comprising a motor configured to generate a traveling drive force, wherein
said vehicle can travel while switching modes between a first traveling mode of stopping said engine and traveling with use of said motor and a second traveling mode of traveling by operating said engine.

11. The vehicle according to claim 9, wherein said electronic control unit is configured to determine said shutter device is immovable in said opened state based upon said opening degree of said shutter and said operation command to said shutter device.

12. The vehicle according to claim 11, wherein said shutter device includes a motor configured to adjust said opening degree of said shutter, said motor being operatively connected to said electronic control unit,
wherein said electronic control unit configured to output said operation command to said motor to adjust said opening degree of said shutter, and
wherein said motor outputs, to said electronic control unit, a position signal indicating a rotating position of said motor as said opening degree of said shutter.

* * * * *

UNITED STATES PATENT AND TRADEMARK OFFICE
CERTIFICATE OF CORRECTION

PATENT NO. : 9,827,845 B2  
APPLICATION NO. : 14/567748  
DATED : November 28, 2017  
INVENTOR(S) : Kazuya Miyaji et al.

Page 1 of 1

It is certified that error appears in the above-identified patent and that said Letters Patent is hereby corrected as shown below:

In the Specification

Column 12, Line 20, before "(Step S220)" delete "a" and insert -- α --, therefor.

Column 12, Line 20, after "predetermined value" delete "a" and insert -- α --, therefor.

Column 12, Line 22, after "predetermined value" delete "a" and insert -- α --, therefor.

Column 12, Line 25, before "(YES in Step S220)" delete "a" and insert -- α --, therefor.

Column 12, Line 28, after "predetermined value" delete "a" and insert -- α --, therefor.

Signed and Sealed this  
Twenty-second Day of May, 2018

Andrei Iancu  
*Director of the United States Patent and Trademark Office*